US005799780A

United States Patent [19]

Steeb, Jr. et al.

[11] Patent Number: 5,799,780
[45] Date of Patent: Sep. 1, 1998

[54] CONVEYOR SUPPORT SYSTEM HAVING REMOVABLE WEAR BARS

[75] Inventors: Raymond H. Steeb, Jr., Bethel Park; Mark E. Mihalyi, Bridgeville, both of Pa.

[73] Assignee: Industrial Composites, Inc., Bridgeville, Pa.

[21] Appl. No.: 791,300

[22] Filed: Jan. 30, 1997

[51] Int. Cl.$^6$ ................................. B65G 15/00
[52] U.S. Cl. ............................ 198/823; 198/841
[58] Field of Search ........................... 198/823, 841

[56] References Cited

U.S. PATENT DOCUMENTS

| 4,735,982 | 4/1988 | Orndorff, Jr. ............... | 524/269 |
| 4,793,470 | 12/1988 | Andersson .................. | 198/841 |
| 5,350,053 | 9/1994 | Archer ....................... | 198/841 |

OTHER PUBLICATIONS

Nova–Roll Corporation, "Ban the Belt Killers!", Copyright 1989, 6 pages.
BFGoodrich, "Linerite Wear and Impact Resistant Materials", 16 pages.

Primary Examiner—Joseph E. Valenza
Assistant Examiner—Khoi H. Tran
Attorney, Agent, or Firm—Webb Ziesenheim Bruening Logsdon Orkin & Hanson, P.C.

[57] ABSTRACT

A conveyor belt system utilizes an idler assembly to support the conveyor belt. The idler assembly includes a pair of legs having a plate suspended therebetween. The plate has slots formed therein parallel to the direction of travel of the conveyor belt. A wear bar has an upper surface formed of a material having a relatively low coefficient of sliding friction with the conveyor belt and a shaft extending from a bottom surface thereof. The shaft is received in the slot of the plate by sliding the wear bar laterally between the plate and the conveyor belt. Once received in the slot, a threaded nut is applied to the threads of the shaft and rotated into contact with the plate thereby compressing the plate between the nut and the bottom surface of the wear bar.

23 Claims, 10 Drawing Sheets

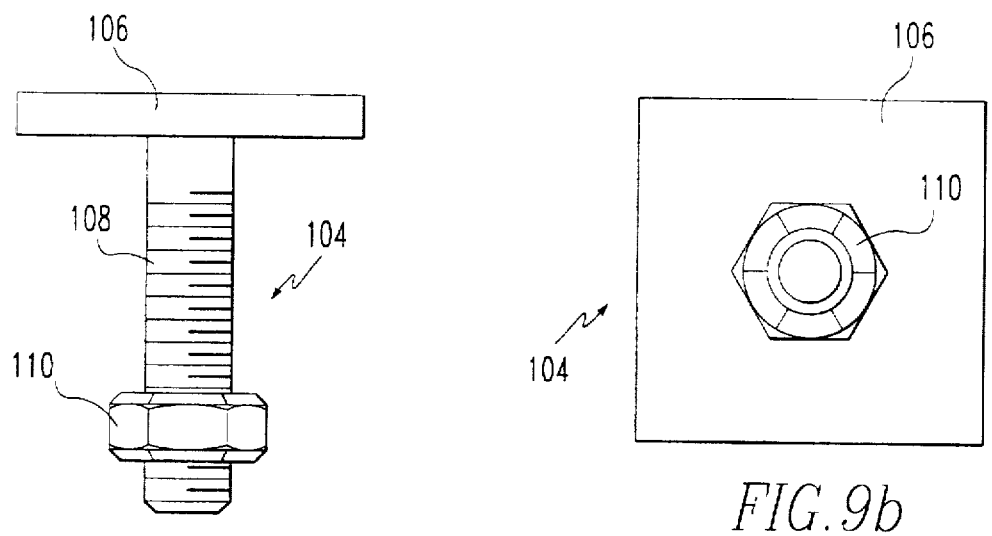
FIG.9a
FIG.9b
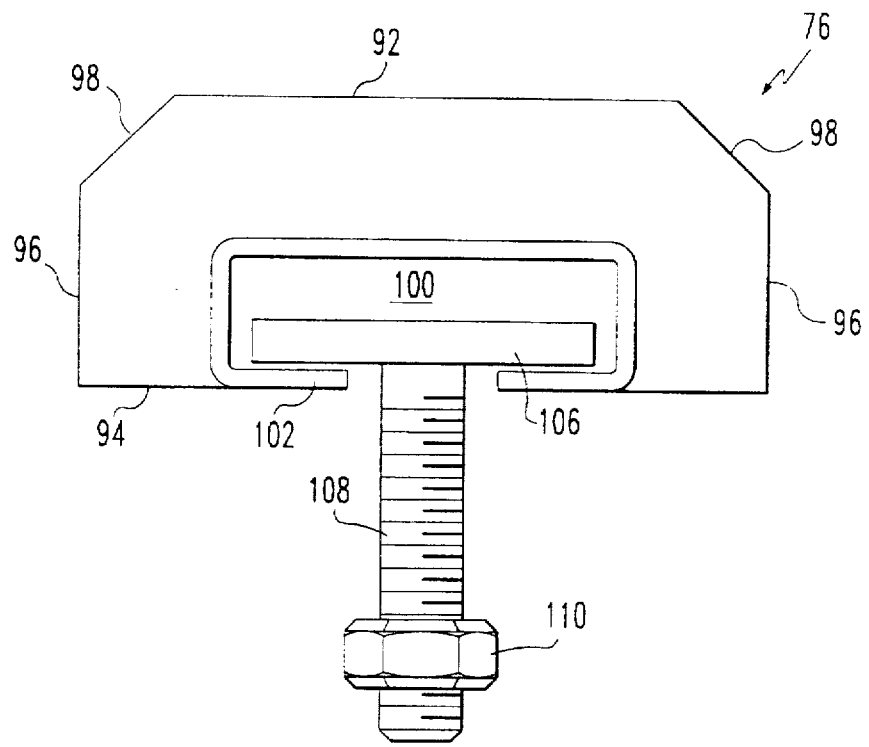
FIG.10

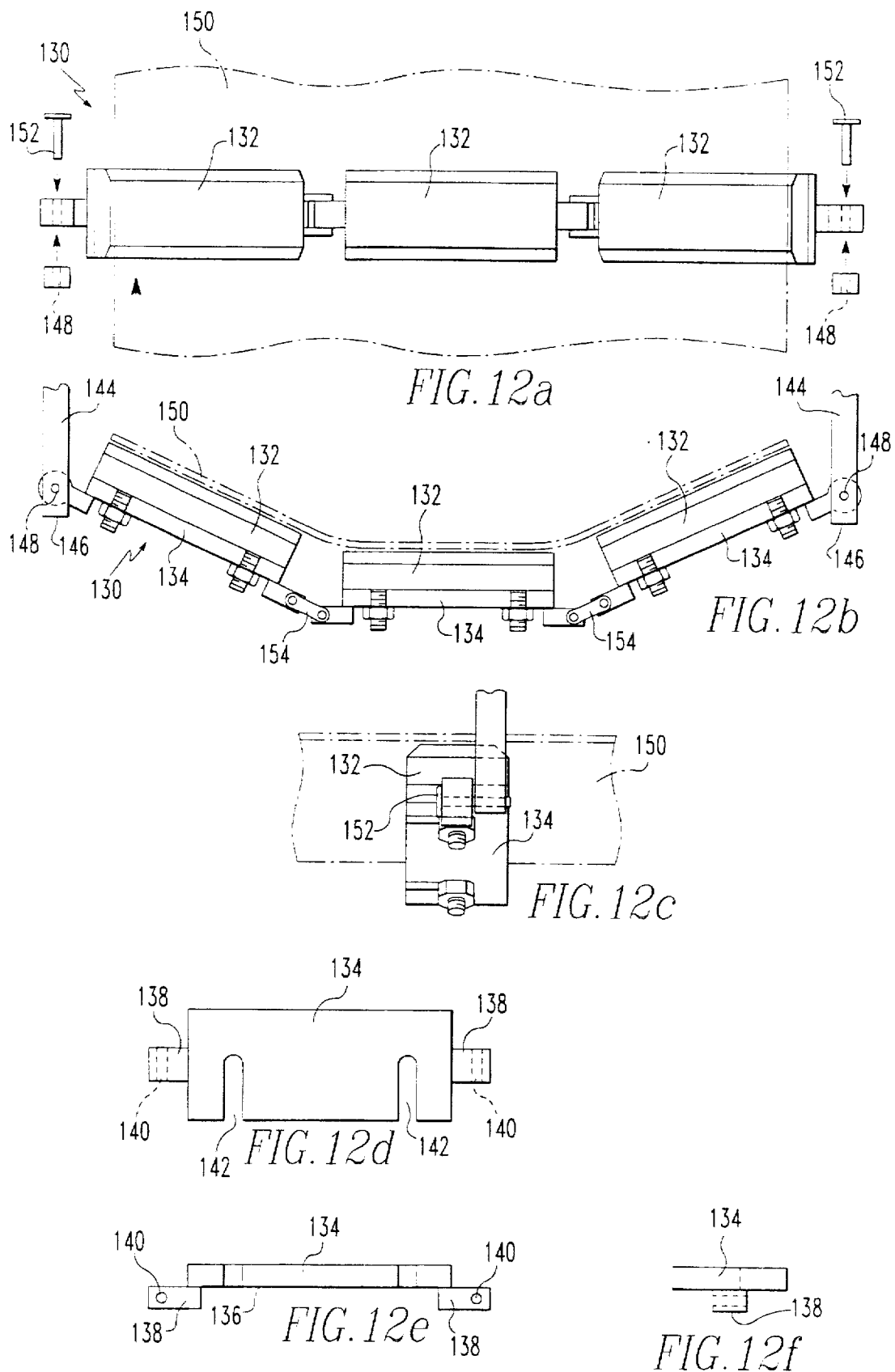

CONVEYOR SUPPORT SYSTEM HAVING REMOVABLE WEAR BARS

CROSS REFERENCE TO RELATED APPLICATION

This application claims priority to U.S. Provisional patent application Ser. No. 60/010,823, filed Jan. 30, 1996 and entitled "Conveyor Support System Having Removable Wear Bars".

BACKGROUND OF THE INVENTION

1. Field of the Invention

This invention relates to conveyor belt support systems and, more particularly, to idlers utilized to support the conveyor belt.

2. Description of the Prior Art

With reference to FIG. 1, manufacturing and mining environments utilize a continuous conveyor belt 2 to transport materials between processing locations. The conveyor belt is typically in the form of a continuous web layer formed by linked elements in an endless loop. Power driven pulleys (not shown) are located at one or both ends of the conveyor belt 2 and are utilized to propel the conveyor belt 2 in an endless loop. Such a conveyor belt 2 is typically not strong enough to be self-supporting. Accordingly, one or more feed idler assemblies 4 are positioned between the ends of the conveyor belt 2 and spaced therealong.

The one or more feed idler assemblies 4 are utilized to support the upper load bearing run of the conveyor belt 2. Each feed idler assemblies 4 includes a generally U-shaped frame 6 having a base 8 positioned transverse to the path of the conveyor belt 2 and a pair of legs 10 positioned on opposite sides of the base 8 and extending upward from the base 8 in a direction towards the conveyor belt 2 and terminating on opposite sides of the conveyor belt 2.

With reference to FIGS. 2a–2c, a plurality of idlers or rollers 14 are suspended between the ends 12 of the legs 10 opposite the base to support the conveyor belt 2 when it is being driven in a continuous loop. Preferably, the plurality of idlers or rollers 14 form a trough between the ends 12 of the legs to support the conveyor belt 2 which tends to conform to the same shape under the influence of a load material being transported thereon. To enable the rollers 14 to form a trough, a pair of intermediate supports 16 are positioned on the base 8 between the legs 10 and extend from the base 8 towards the conveyor belt 2. The intermediate supports 16 are shorter than the legs 10 so that rollers 14 suspended between the ends 12 of the legs 10 and ends 18 of the adjacent intermediate supports 16 converge towards the base 8. Another roller 14 is suspended between the intermediate supports 16 parallel to the base 8. The rollers 14 thus connected form the trough between the ends 12 of the legs 10.

Each roller 14 has a bearing assembly 20 positioned at opposite ends thereof. As best shown in FIG. 2c, the end 22 of each bearing assembly 20 is oblong shaped and adapted to fit into lengthwise oriented slots 24 formed in the ends 12 of the legs 10 and the ends 18 of the intermediate supports 16. The rollers 14 are installed in the frame 6 by aligning the oblong-shaped ends 22 of the bearing assemblies 20 with the lengthwise slots 24 in the legs 10 and/or the intermediate supports 16. Each roller 14 is then moved in a direction parallel to the slots 24.

To prevent the roller 14 from becoming disassociated form the frame 6, the oblong shaped ends 22 of the bearing assemblies 20 are secured in the slots 24. To further prevent the rollers from become disassociated with the frame 6, the conveyor belt 2 is tensioned to fit snugly against the rollers 14.

With reference to FIG. 3, in another prior art embodiment, a plurality of rollers 14 are suspended between a pair of legs 26 that extend downward from a frame (not shown). The rollers 14 have bearing assemblies 20 on opposite ends thereof. Chain link elements 30 are connected between the bearing assemblies 20 of adjacent rollers 14. The bearing assemblies 20 are connected to the legs 26 via a pivotal link, such as a pin and aperture arrangement or a chain link element. The chain link elements 30 and the pivotal connection of the bearing assemblies 20 to the legs 26 enable the rollers to adjust their position relative to each other in conformance to the shape of the conveyor belt passing thereover.

With reference to FIGS. 4a and 4b, a return idler assembly 32 is utilized for the lower return run of the conveyor belt 2. The return idler assembly 32 includes a pair of legs 34 and a return roller 36 positioned between the legs 34. The return roller 36 includes bearing assemblies 38 positioned at opposite ends thereof. The ends 40 of the bearing assemblies 38 are oblong-shaped and adapted to slidably fit in lengthwise slots 42 formed in the legs 34 of the return idler assembly 32.

A problem with utilizing rollers, e.g., 14 or 36, is that when a bearing assembly, e.g., 20 or 38, fails, the roller does not rotate about its axis in response to contact with the moving conveyor belt sliding thereover. When this occurs, the conveyor belt and the portion of the roller in contact therewith are exposed to frictional wear caused by the interaction of the moving conveyor belt against the stationary roller. This friction tends to wear down the roller and the conveyor belt. If this condition is allowed to persist, the conveyor belt will be subject to premature wear and breakage. Moreover, the power driven pulley(s) and the motor(s) driving the power driven pulley(s) are required to impart additional power to the conveyor belt to overcome such friction. This provisioning of additional power causes unnecessary wear of the power driven pulley(s) and the motor(s) associated therewith.

Another problem with the prior art idler assemblies is the difficulty of replacing defective rollers. Specifically, to remove a roller, the conveyor belt tension must be loosened so that the conveyor belt can be raised sufficiently to permit removal of one roller and the insertion of another roller into the lengthwise slots. Tension must then be reapplied to the conveyor belt prior to use.

It is an object of the present invention to overcome these problems and other problems by providing a wear bar that enables the conveyor belt to slide thereover without subjecting the belt to the frictional wear caused by the conveyor belt sliding over a non-rotating roller. It is another object of this invention to provide an apparatus that enables the easy replacement of wear bars without loosening the tension of the conveyor belt.

SUMMARY OF THE INVENTION

Accordingly, we have invented an idler assembly for supporting a conveyor belt. The idler assembly includes a frame, a first plate connected to the frame and a first wear bar connected to the first plate. The first plate has a slot formed therein transverse to a longitudinal axis thereof. The first wear bar has an upper surface adapted to engage the conveyor belt and a bottom surface having a shaft extending therefrom. The shaft extending from the bottom surface of the wear bar is received in the slot of the first plate.

In one embodiment of the invention, the frame includes a pair of leg spaced laterally on opposite sides of the conveyor belt. The first plate is connected between the legs in a manner wherein the open end of the slot is preferably oriented facing opposite the direction of travel of the conveyor belt.

In another embodiment of the invention, the frame includes a base extending between the legs and positioned on the side of the first plate opposite the first wear bar. A first intermediate support extends between the base and the first plate. The first intermediate support is shorter than the legs and the plate extends between the first intermediate support and a position on each leg opposite the base.

In another embodiment of the invention, a second support plate and a second wear bar are provided. The second support plate has a slot formed therein transverse to a longitudinal axis thereof. The second wear bar has an upper surface adapted to engage the conveyor belt and a bottom surface having a shaft extending therefrom and received in the slot of the second plate. In this embodiment, the first plate extends between the first intermediate support and a position on one leg opposite the base and the second plate extends between the first intermediate support and a position on the other leg opposite the base.

In another embodiment, a third plate and a third wear bar are provided. The third plate is connected to the frame and has a slot formed therein transverse to a longitudinal axis thereof. The third wear bar has a top surface adapted to engage a conveyor belt and a bottom surface having a shaft extending therefrom and received in the slot of the third plate. The frame includes a second intermediate support extending between the base and the second plate. In this embodiment, one end of the first plate is connected to one of the legs and the other end of the first plate is connected to the first intermediate support. One end of the second plate is connected to the first intermediate support and the other end of the second plate is connected to the second intermediate support. One end of the third plate is connected to the second intermediate support and the other end of the third plate is connected to the other one of the legs.

In another embodiment, three plates are linked together end to end between a pair of legs. Each plate has a slot formed therein transverse to a longitudinal axis thereof. Three wear bars have top surfaces adapted to engage the conveyor belt and bottom surfaces having shafts extending therefrom are received in the slots of the three plates. The plates are connected to each other end to end via pivotable links and the extreme ends of the three end to end connected plates are pivotally connected to the legs.

In another embodiment, an idler for supporting a conveyor belt includes a support plate, a wear bar and a means for securing the wear bar to the support plate. The support plate has a slot formed therein transverse to the longitudinal axis thereof. The wear bar has a shaft extending from a bottom side thereof. The slot and the shaft are adapted to coact such that the shaft is receivable in the slot. The means for securing is utilized to secure the wear bar to the support plate when the shaft is received in the slot. The means for securing, preferably, includes a nut receivable on a threaded end of the shaft. Rotation of the nut compresses the plate between the nut and bottom side of the wear bar.

In accordance with the present invention, a method for replacing a wear bar on a plate of an idler assembly of a conveyor system is provided. In the method, a side of the wear bar is positioned adjacent a side of the plate having a slot therein. The shaft is aligned with the open end of the slot and the wear bar is moved laterally between the plate and the conveyor belt so that the shaft is received in the slot. The wear bar is secured to the support plate via the shaft by applying a threaded nut to a threaded end of the shaft and by compressing the plate between the nut and the bottom of the wear bar.

BRIEF DESCRIPTION OF THE DRAWINGS

FIGS. 9a–9b are side and bottom views of a T-bolt utilized to secure the wear bars of FIGS. 8a–8c to the plates of FIGS. 5a–5c or to the plate of FIGS. 6a–6c;

FIG. 10 is an end view of the wear bar of FIGS. 8a–8c with the T-bolt of FIGS. 9a–9b installed in a channel thereof;

FIGS. 12a–12c are top, front and side views of a feed idler assembly in accordance with another embodiment of the present invention;

FIGS. 12d–12f are top, front and side views of a plate utilized to support a wear bar in the embodiment of FIGS. 12a–12c.

DESCRIPTION OF THE PREFERRED EMBODIMENTS

Figure 1:
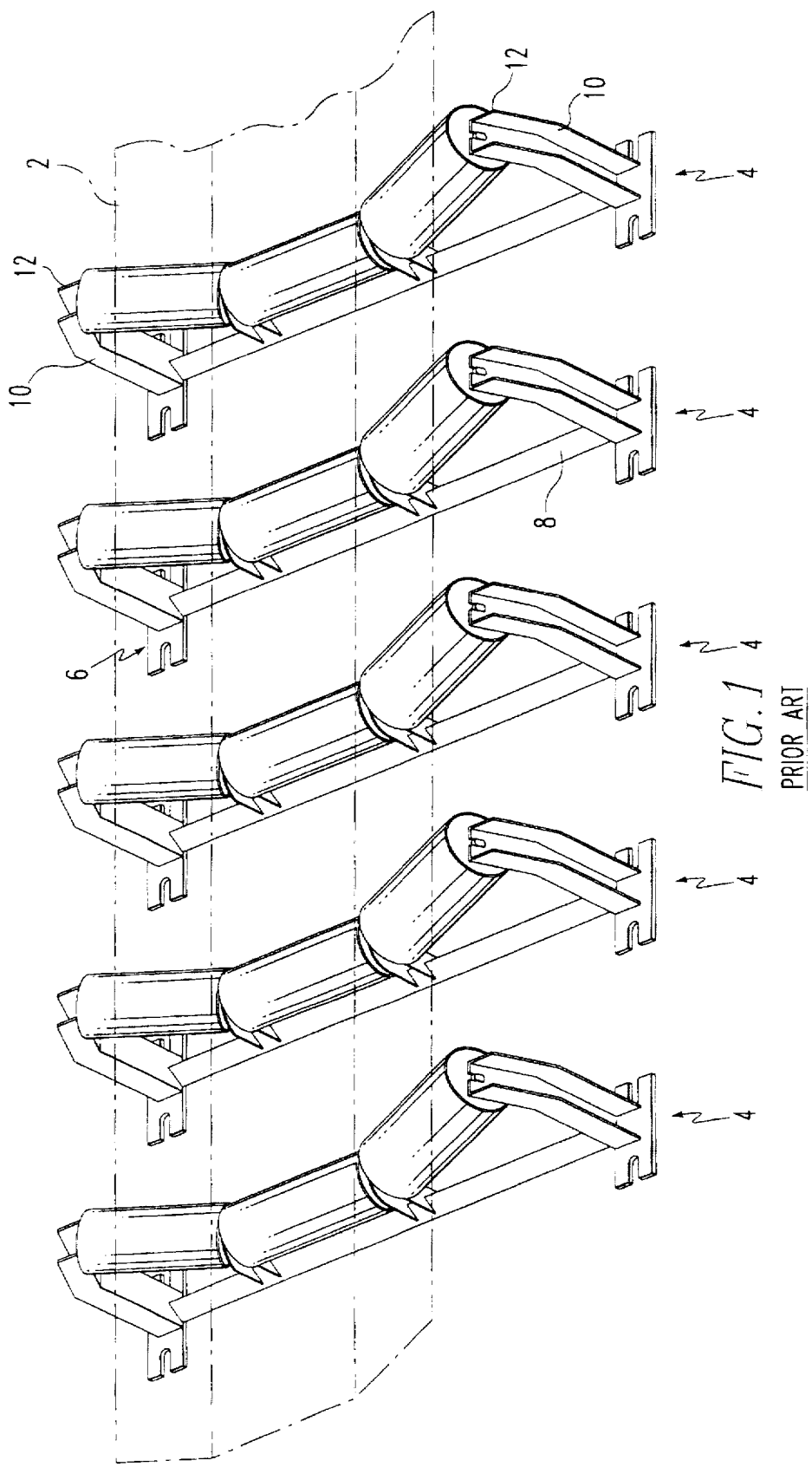
FIG. 1 is a perspective view of a prior art conveyor system.
Figure 2A:
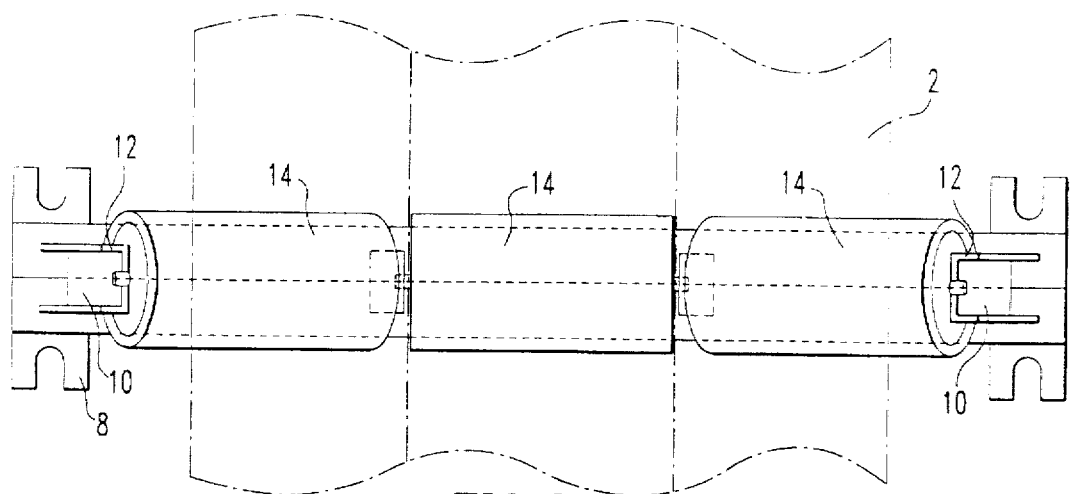
FIGS. 2a–2c are top, front and side views of a prior art feed idler assembly.
Figure 2B:
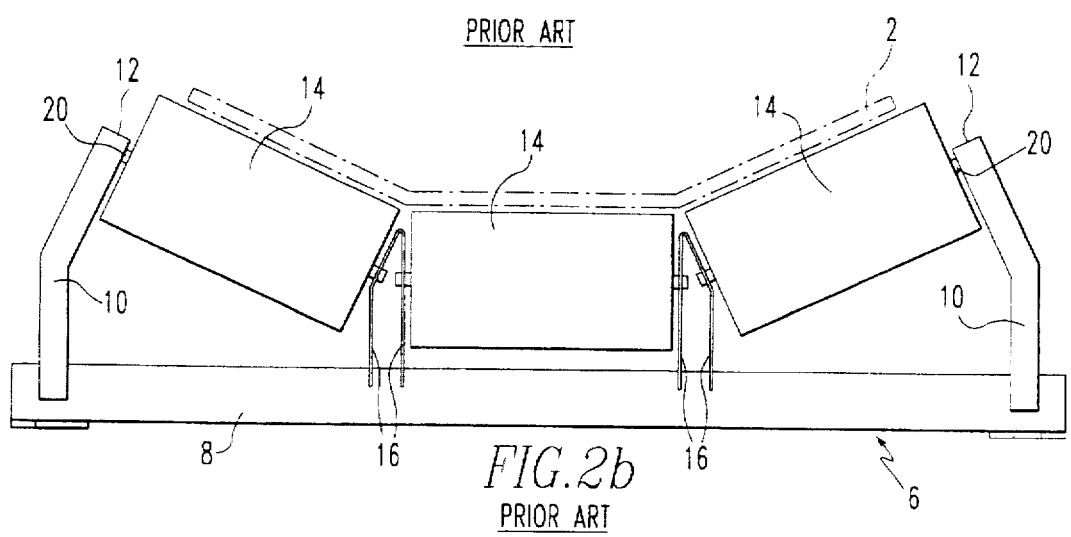
Figure 2C:
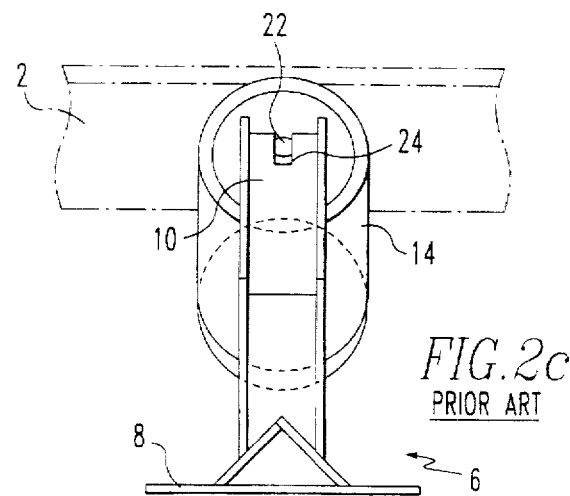
Figure 5A:
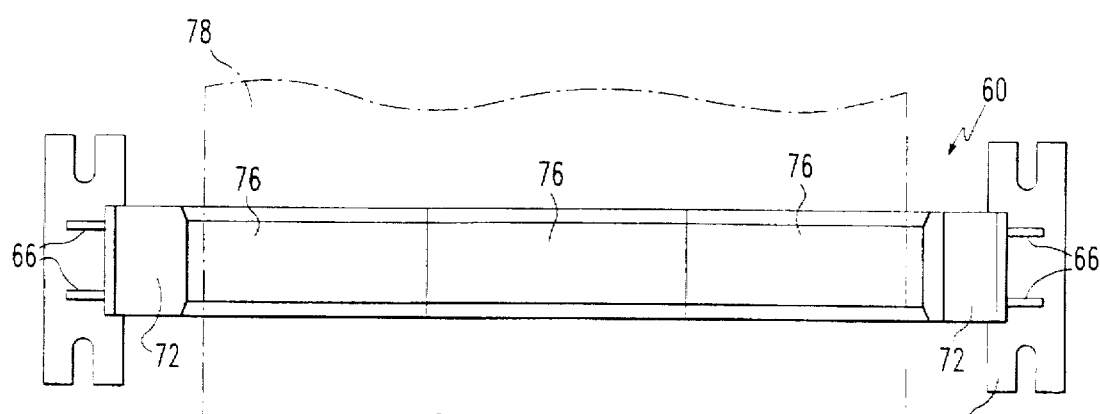
FIGS. 5a–5c are top, front and side views of a feed idler assembly in accordance with one embodiment of the present invention.
Figure 5B:
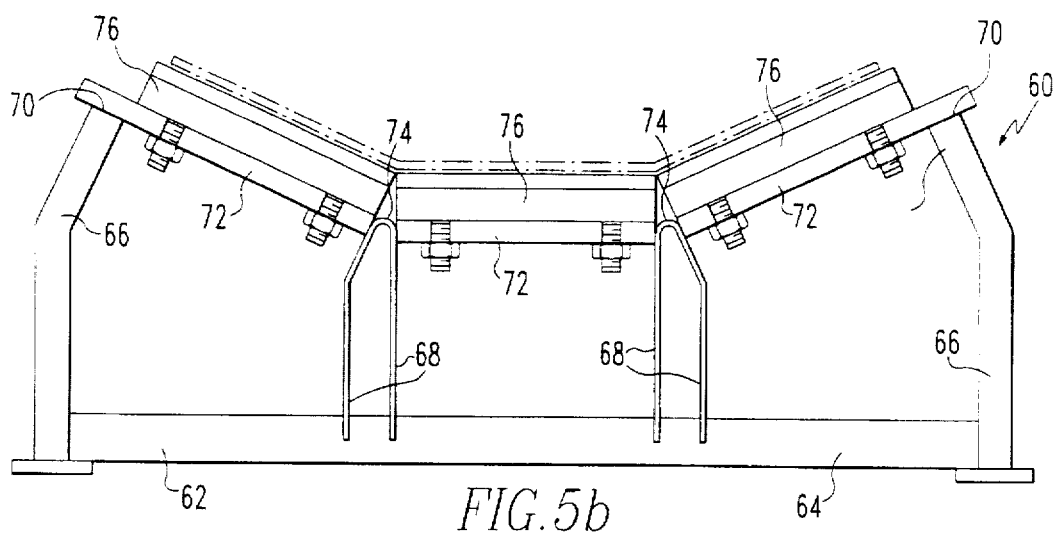
Figure 5C:
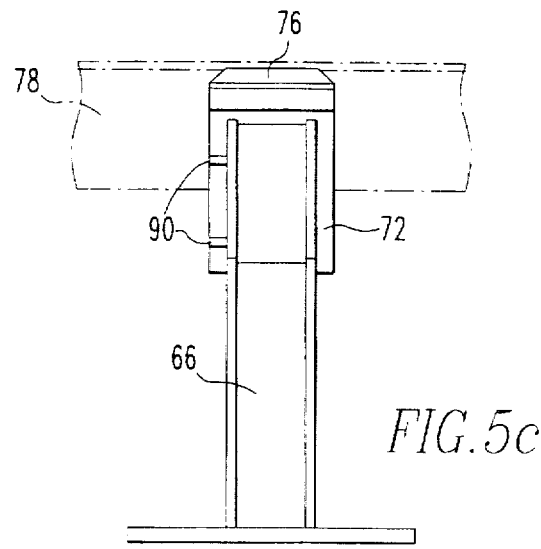

A first embodiment of a feed idler assembly in accordance with the present invention is shown in FIGS. 5a–5c. The feed idler assembly 60 includes a generally U-shaped frame 62 having a base 64 and a pair of legs 66 positioned on opposite ends of the base 64. A pair of shorter intermediate supports 68 are positioned between the legs 66. A plurality of plates 72 are attached between the ends 70 of the legs 66 opposite the base 64 and the ends 74 of the intermediate supports 68 opposite the base 64 and between the ends 74 of the intermediate supports 68. Wear bars 76 are attached to the plates 72 on the side thereof opposite the base 64 of the U-shaped frame 62. A conveyor belt 78 (shown in phantom) is positioned to slide over the wear bars 76. The plates 72 are preferably adapted to replace rollers 14 of the type shown in FIGS. 2a–2c thereby providing a suitable support for the wear bar 76.

Figure 6A:
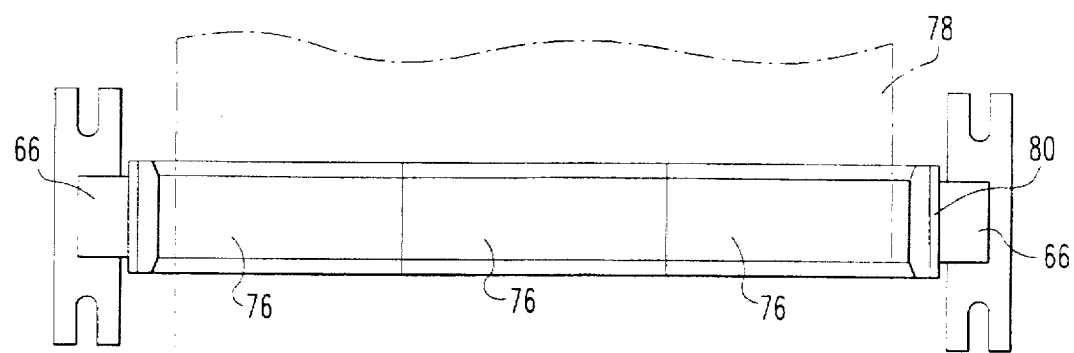
FIGS. 6a–6c are top, front and side views of a feed idler assembly in accordance with another embodiment of the present invention.
Figure 6B:
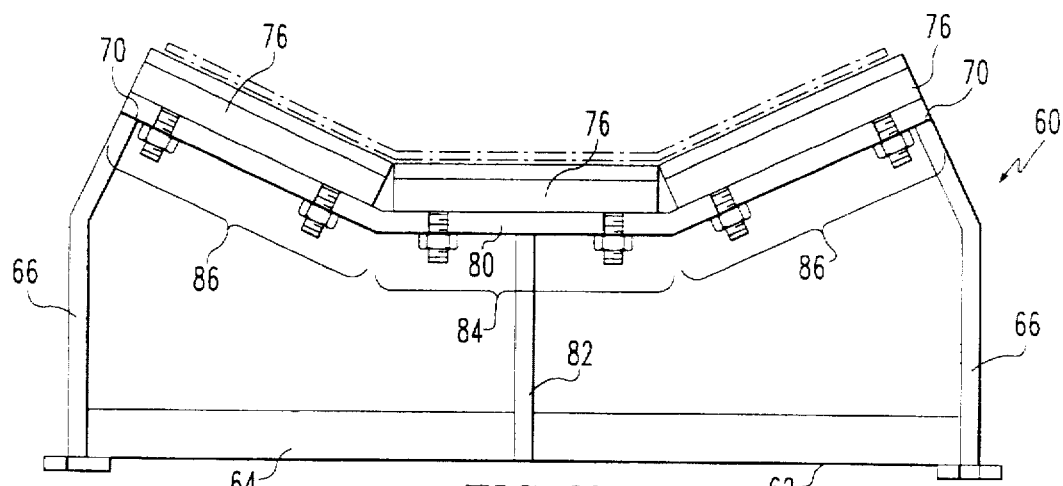
Figure 6C:
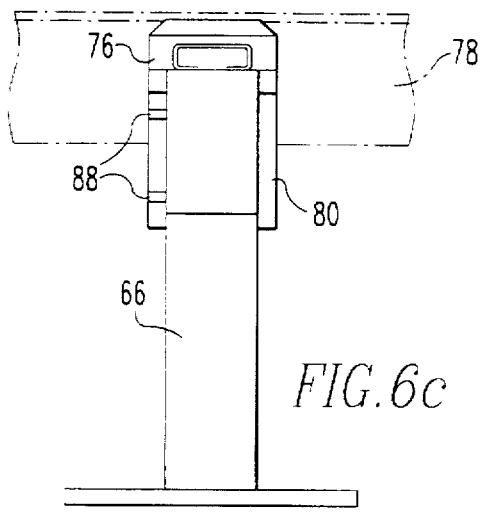

With reference to FIGS. 6a–6c, in another embodiment adapted to new or replacement installations of entire feed idler assemblies, a continuous plate 80 is suspended between the ends 70 of the legs 66. An intermediate support 82 is positioned between the legs 66 and between the base 64 and the continuous plate 80. A plurality of wear bars 76, here three, are positioned on the surface of the continuous plate 80 opposite the base 64. A central part 84 of the continuous plate 80 is positioned parallel with the base 64 of the U-shaped frame 62. The ends 86 of the continuous plate 80 are angled upwardly from the central part 84 thereof and converge with the ends 70 of the legs 66. Alternatively, plate 80 can be formed from two separate plates attached between the ends 70 of legs 66 and the end of the intermediate support 82 opposite the base.

Figure 7A:
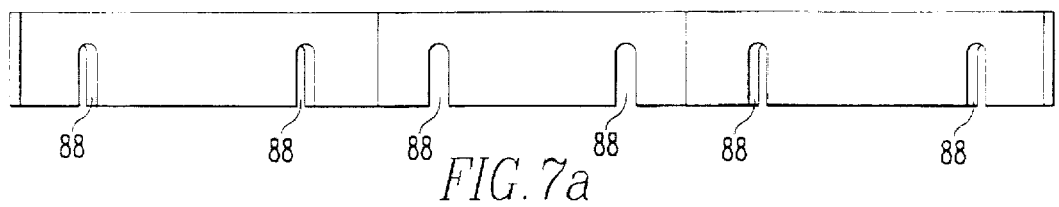
FIGS. 7a–7c are top, front and side views of a plate utilized in the feed idler assembly of FIGS. 6a–6c.
Figure 7B:
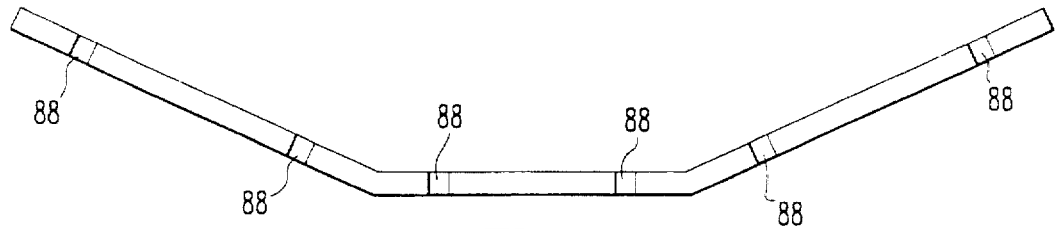
Figure 7C:
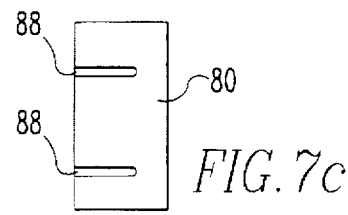

With reference to FIGS. 7a–7c and with continuing reference to FIGS. 6a–6c, the continuous plate 80 includes a plurality of slots 88 formed therein in a direction transverse to a longitudinal axis of the continuous plate 80. Similarly, each plate 72 in the embodiment shown in FIGS. 5a–5c includes a pair of slots 90 formed therein in a direction transverse to the longitudinal axis of the plate 72.

Figure 8A:
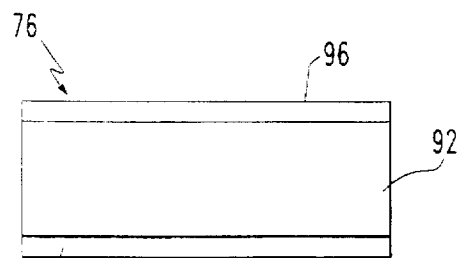
FIGS. 8a–8c are top, front and side views of a wear plate utilized with the plate of FIGS. 6a–6c or the plates of FIGS. 5a–5c.
Figure 8B:
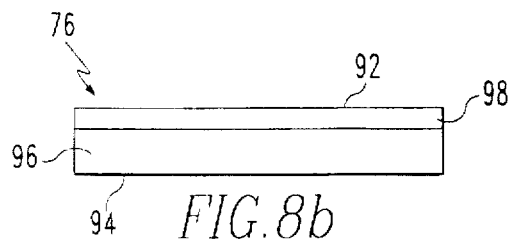
Figure 8C:
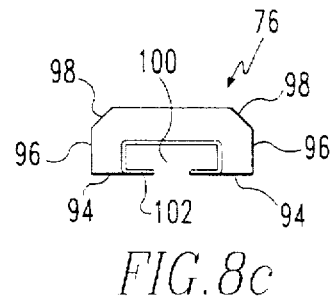

With reference to FIGS. 8a–8c, each wear bar 76 has an upper or top surface 92 and a lower or bottom surface 94. The wear bar 76 has sides 96 that extend upwardly between the bottom surface 94 of the wear bar 76 and the upper surface 92 of the wear bar 76. The wear bar 76 includes tapered sides 98 extending between the sides 96 and the upper surface 92 of the wear bar 76. The tapered sides 98 avoid sharp edges between sides 96 and upper surface 92 that may catch the conveyor belt sliding thereover. Alternatively, the wear bar 76 can be formed in other shapes that avoid sharp edges that may catch the conveyor belt sliding thereover. One such alternate shape includes, without limitation, a rounded upper surface extending between opposite sides of a flat bottom surface.

The wear bar includes a C-shaped channel 100 formed therethrough along the lengthwise axis thereof. The C-shaped channel 100 debouches into the bottom surface 94 of the wear bar 76 and includes a sleeve 102 therein, preferably made of metal. The wear bar is preferably formed of a material designed to resist wear, impact, abrasion and corrosion caused by the conveyor belt sliding thereover. A material suitable for the wear bar is described in U.S. Pat. No. 4,735,982 to Orndorff, Jr., expressly incorporated herein by reference.

With reference to FIGS. 9a and 9b, a T-bolt 104 is utilized to secure the wear bar 76 to the plate 72 or 80 of the feed idler assemblies 60 shown in FIGS. 5b and 6b, respectively. The T-bolt 104 includes a rectangular or square headed end 106 adapted to fit into the sleeve 102 of the C-shaped channel 100 and a threaded shaft 108 extending from one side of the headed end 106. Attached to the threaded shaft 108 is a nut 110 having a threaded central aperture. The threads of the bolt 110 are adapted to mate with the threads of the threaded shaft 108.

With reference to FIG. 10, the headed end 106 of the T-bolt 104 is positioned in the sleeve 102 of the C-shaped channel 100 through an end of the wear bar 26. The threaded shaft 108 projects through the opening in the C-shaped channel 100 and away from the bottom surface 94 of the wear bar 76.

To install a wear bar 76 to a plate 72 or 80, a plurality of T-bolts 104 are positioned in the sleeve 102 of the C-shaped channel 100 of the wear bar 76 so that the shafts 108 thereof are receivable in slots 90 or 88. The bottom surface 94 of the wear bar 76 is shifted laterally onto a surface of the plate 72 or 80 so that the shafts 108 are received in the slots 90 or 88 thereof. Once the shafts 108 are received in the slots 90 or 88, the nuts 110 are tightened against the side of the plate opposite the wear bar 76 thereby compressing the plate 72 or 80 between the nut 100 and the bottom surface 94 of the wear bar 76. In this manner, the wear bar 76 is secured to the plate 72 or 80.

The open end of the slots 88 or 90 are preferably oriented facing a direction opposite the direction of travel of the conveyor belt 78. Hence, the lateral movement of the shaft 108 into the slots 90 or 88 corresponds to the direction of travel of the conveyor belt 78. Moreover, the conveyor belt 78 sliding over the upper surface 92 of the wear bar 76 urges the shafts 108 into the bottom of the slots 90 or 88, thereby helping maintain the wear bar 76 on the plate 72 or 80.

Figure 11A:
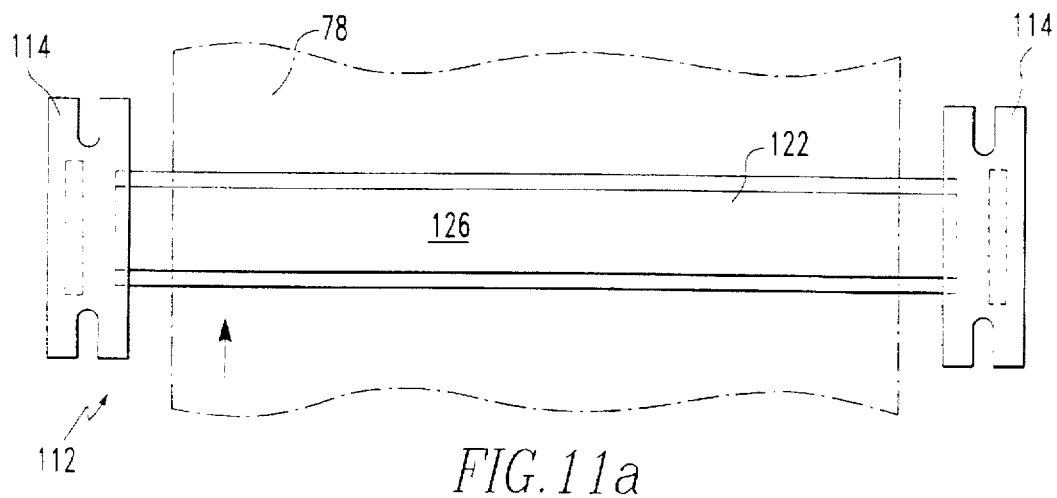
FIGS. 11a–11c are top, front and side views of a return idler assembly in accordance with the present invention.
Figure 11B:
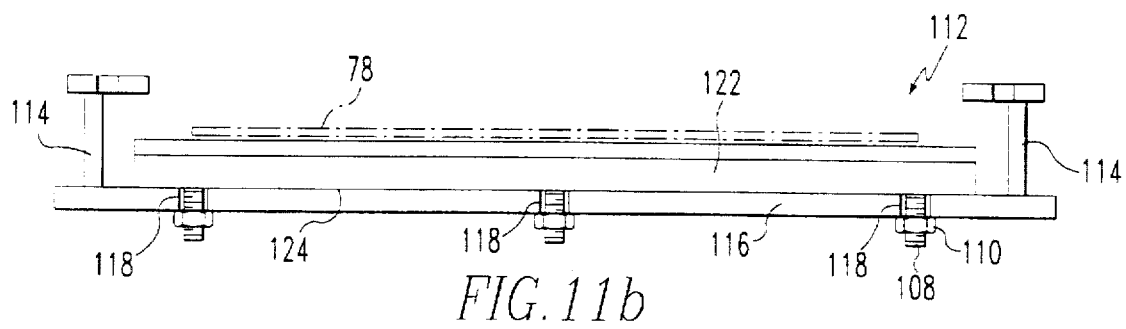
Figure 11C:
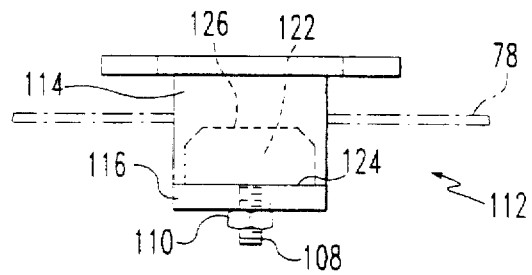

With reference to FIGS. 11a–11c, a lower or return idler 112 includes a pair of legs 114 having a plate 116 connected therebetween. The plate 116 is, preferably, flat and includes slots 118 formed therein transverse to a longitudinal axis thereof. A wear bar 122 has shafts 108 extending from a bottom surface 124. The shafts 108 of the wear bar 122 are received in the slots 118 of the plate 116. The wear bar 122 is secured to the plate 116 by tightening nuts 110 on the shaft against the side of the plate opposite the wear bar thereby compressing the flat plate 116 between the nut 110 and the bottom surface 124 of the wear bar 122. In use, the conveyor belt 78 slides over an upper surface 126 of the wear bar 122. Preferably, the slots 118 formed in flat plate 116 are oriented so that the conveyor belt 78 sliding over the wear bar 122 urges the shafts 108 into the slots 118.

Figure 3:
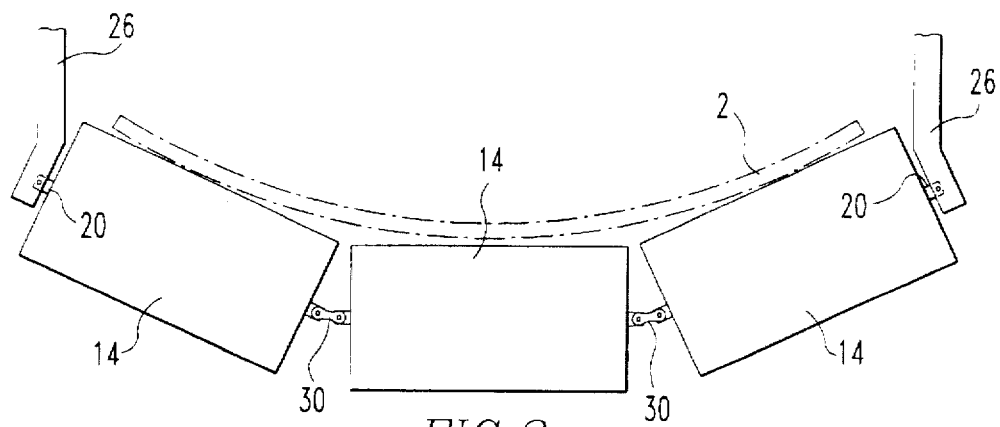
FIG. 3 is a front view of a prior art feed idler assembly having pivotal links between adjacent rollers and between the rollers and the legs.
Figure 4A:
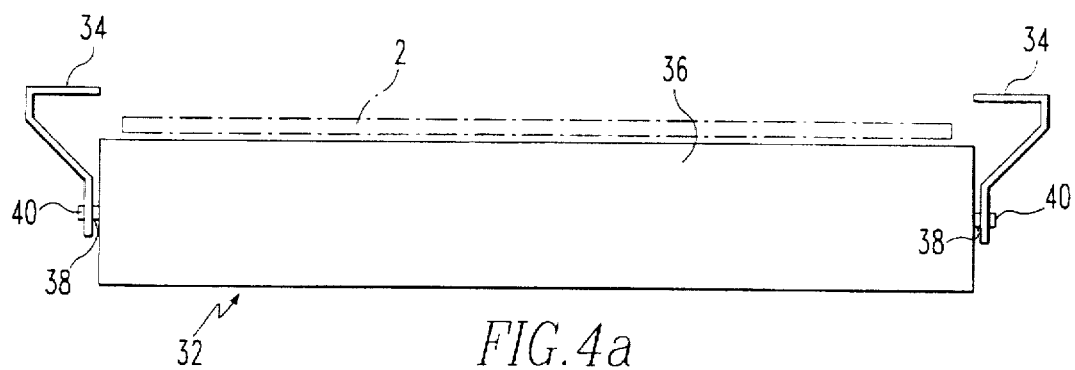
FIGS. 4a–4b are front and side views of a prior art return idler assembly.
Figure 4B:
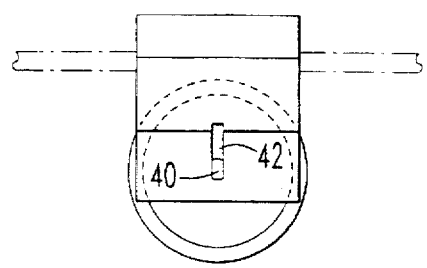

With reference to FIGS. 12a–12f, in another embodiment, a feed idler assembly 130 includes a plurality of wear bars 132 secured to a like plurality of plates 134 in the above described manner. Extending from a bottom surface 136 of the ends of each plate 134 are wings 138. Each wing 138 has an aperture 140 therethrough that extends parallel to slots 142 formed in the plate 134. In use, a plurality of end-to-end connected plates 134, with wear bars 132 attached thereto, are connected between legs 144. Specifically, the ends 146 of the legs 144 have apertures 148 extending therethrough in a direction parallel to the direction of travel of conveyor belt 150. The wings 138 of the plates 134 are pivotally secured to the legs 144 by projecting pins 152 through the apertures 140 in the wings 138 and the apertures 148 in the legs 144. The wings 138 between adjacent plates are connected via chain link elements 154 extending between adjacent wings 138. Hence, like the plurality of rollers suspended between the legs 28 in FIG. 3, the wear bars of the feed idler assembly 130 in FIGS. 12a–12c are pivotable with respect to each other. Thus, the shape of the wear bars 132 of the feed idler 130 can conform to the shape of the conveyor belt 150 sliding thereover.

Figure 13A:
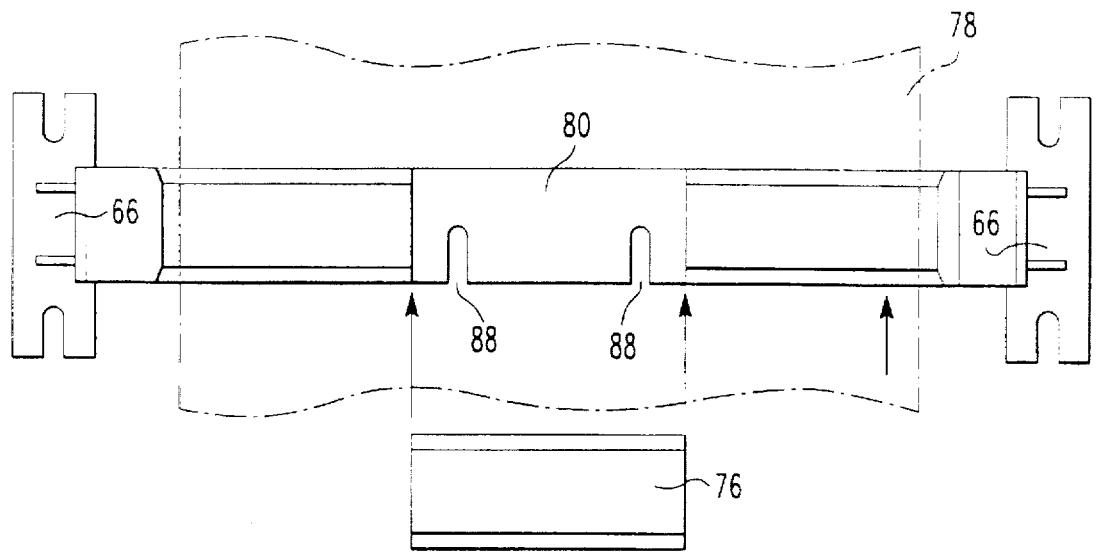
FIGS. 13a–13b are top and side views of the embodiment shown in FIGS. 6a–6c illustrating the installation of the wear bar to the plate.
Figure 13B:
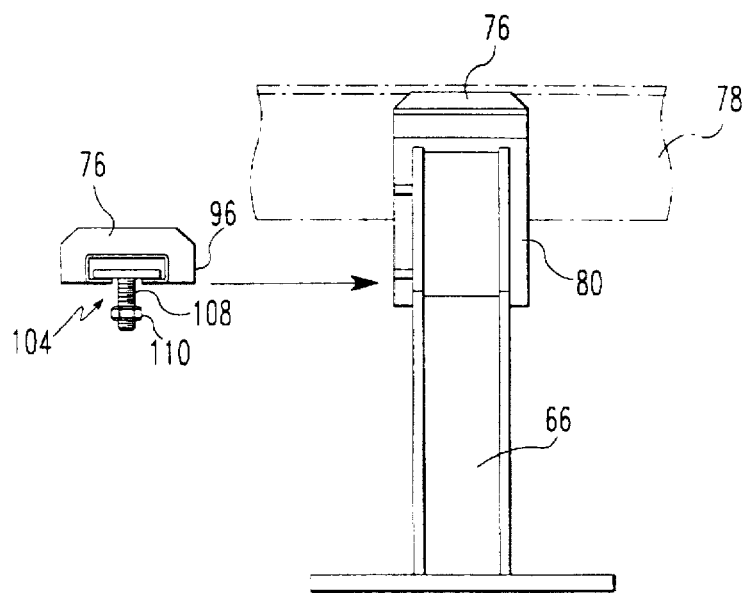

With reference to FIGS. 13a and 13b, to install a wear bar, e.g. 76, on a plate, e.g., 80, a side 96 of the wear bar 76 is positioned adjacent a side 156 of the plate 80 having the open end of the slot 88 therein. The shafts 108 of the T-bolts 104 are aligned with the slots 88. Once aligned, the wear bar 76 is moved laterally between the plate 80 and the conveyor belt 78 so that the shafts 108 are received in the slots 88. The wear bar 76 is secured to the support plate 80 via the shaft 108 by applying a threaded nut 110 to a threaded end of the shaft 108. The nut 110 is adjusted until the plate 80 is compressed between the nut 110 and the bottom surface 94 of the wear bar 76. The conveyor belt 78 has sufficient tension at its ends to resist movement of direction normal to the surface thereof. Accordingly, the conveyor belt 78 helps maintain the shafts 108 of the wear bars 76 in the slots 88 of the plate 80.

To remove the wear bar 76, the above process is reversed. Specifically, the nut 110 is loosened so that plate 80 is released from compression between the nut 110 and the wear bar 76. The wear bar 76 is then moved laterally between the conveyor belt 78 and the plate 80 so that the shaft 108 becomes disassociated from the slots 88. Once free of the plate 80, the wear bar 76 can be moved away from the conveyor belt 78 and the plate 80.

It should be obvious from the foregoing that the present invention provides a wear bar that enables a conveyor belt to slide thereover with less wear than the conveyor belt sliding over a non-rotating roller. It should also be apparent that the present invention provides an apparatus that enables the replacement of wear bars without having to loosen the tension of the conveyor belt.

The present invention has been described with reference to the preferred embodiments. Obvious modifications, combinations and alterations will occur to others upon reading and understanding the preceding detailed description. It is intended that the invention be construed as including all such modifications and alterations insofar as they come within the appended claims or the equivalents thereof.

We claim:

1. An idler assembly for supporting a conveyor belt, the idler assembly comprising:

a frame;

a first plate connected to the frame, the first plate having at least one slot formed therein transverse to a longitudinal axis thereof; and a first wear bar having an upper surface adapted to engage the conveyor belt and a bottom surface having a shaft extending therefrom and received in the slot of the first plate and attached thereto.

2. The idler assembly as set forth in claim 1, wherein the frame includes a pair of legs spaced laterally on opposite sides of the conveyor belt, wherein the first plate is connected between the legs.

3. The idler assembly as set forth in claim 1, wherein the slot extends perpendicular to the longitudinal axis of the first plate.

4. The idler assembly as set forth in claim 3, wherein the open end of the slot is oriented facing opposite the direction of travel of the conveyer belt.

5. The idler assembly as set forth in claim 2, wherein the frame further includes a base extending between the legs and positioned on the side of the first plate opposite the first wear bar.

6. The idler assembly as set forth in claim 5, wherein the frame further includes a first intermediate support extending between the base and the first plate.

7. The idler assembly as set forth in claim 6, wherein the first intermediate support is shorter than the legs, and wherein the first support plate extends between the intermediate support and a position on each leg opposite the base.

8. The idler assembly as set forth in claim 6, further including a second plate having a slot formed therein transverse to a longitudinal axis thereof, a second wear bar having an upper surface adapted to engage the conveyor belt and a bottom surface having a shaft extending therefrom and received in the slot of the second plate, wherein the first plate extends between the first intermediate support and a position on one leg opposite the base and the second plate extends between the first intermediate support and a position on the other leg opposite the base.

9. The idler assembly as set forth in claim 6, further including:

a second plate connected to the frame and having a slot formed therein transverse to a longitudinal axis thereof;

a second wear bar having an upper surface adapted to engage the conveyor belt and a bottom surface having a shaft extending therefrom and received in the slot of the second plate;

a third plate connected to the frame and having a slot formed therein transverse to a longitudinal axis thereof; and a third wear bar having a top surface adapted to engage the conveyor belt and a bottom surface having a shaft extending therefrom and received in the slot of the third plate, wherein the frame includes a second intermediate support extending between the base and the second plate, and wherein the ends of the first support are connected between one of the legs and the first intermediate support, the ends of the second plate are connected between the first intermediate support and the second intermediate support and the ends of the third plate are connected between the second intermediate support and the other one of the legs.

10. The idler assembly as set forth in claim 2, further including:

a second plate having a slot formed therein transverse to a longitudinal axis thereof;

a second wear bar having a top side adapted to engage the conveyor belt and a bottom side having a shaft extending therefrom and received in the slot of the second plate;

a third plate having a slot formed therein transverse to a longitudinal axis thereof; and a third wear bar having a top side adapted to engage the conveyor belt and a bottom side having a shaft extending therefrom and received in the slot of the third plate, wherein one end of the first plate is pivotably connected to one of the legs, the other end of the first plate is connected to one end of the second plate via a pivotable link, the other end of the second plate is connected to one end of the third plate via a pivotable link and the other end of the third plate is pivotably connected to the other leg.

11. The idler assembly as set forth in claim 1, wherein the wear bar includes a C-shaped channel formed therein between the ends of the wear bar, wherein the open end of the C-shaped channel debouches into the bottom surface of the wear bar.

12. The idler assembly as set forth in claim 11, wherein the shaft has a headed end adapted to be received in the C-shaped channel via the ends of the wear bar and the shaft has a threaded end adapted to coact with mating threads of a nut.

13. The idler assembly as set forth in claim 10, wherein the pivotable link is at least one of a chain link element and a pin and aperture arrangement.

14. An idler for supporting a conveyor belt, the idler comprising:

a plate having a slot formed therein transverse to a longitudinal axis thereof;

a wear bar having a shaft extending from a bottom side thereof, the slot and the shaft adapted to coact such that the shaft is receivable in the slot; and means for securing the wear bar to the plate when the shaft is received in the slot.

15. The idler as set forth in claim 14, wherein the shaft is threaded and the means for securing includes a nut receivable on the threads of the shaft, wherein rotation of the nut compresses the plate between the nut and the bottom side of the wear bar.

16. The idler assembly as set forth in claim 15, wherein the shaft is received in the slot by moving the wear bar laterally to the support plate.

17. The idler assembly as set forth in claim 14, wherein the idler is attachable to a frame of an idler assembly.

18. The idler assembly as set forth in claim 14, wherein the wear bar is comprised of a thermoplastic rubber polymer alloy.

19. The idler assembly as set forth in claim 18, wherein the thermoplastic rubber polymer alloy is comprised of:

a particulate cured rubber compound having a particle size of 35 mesh or smaller, said cured rubber compound being a low friction, water resistant compound;

an ultra molecular weight polyethylene polymer, said ultra high molecular weight polyethylene polymer having a weight average molecular weight of at least 2.5 million the amount of said ultra high molecular weight polyethylene polymer being an effective amount to form a continuous phase in the polymer allow and to coat, said rubber particles; and a non-abrasive lubricant, the amount of said lubricant being an effective amount to impart lubricating properties to said alloy.

20. A method for replacing a wear bar on a support plate of an idler assembly of a conveyor system, wherein the conveyor system has a conveyor belt, the support plate has a slot formed therein parallel to a direction of travel of the conveyor belt and the wear bar has a shaft extending from a bottom surface thereof, the method comprising the steps of:

positioning a side of the wear bar adjacent a side of the plate having the open end of the slot therein;

aligning the shaft with the slot;

moving the wear bar laterally between the plate and the conveyor belt so that the shaft is received in the slot; and securing the wear bar to the support plate via the shaft.

21. The method as set forth in claim 20, wherein the conveyor belt is sufficiently tensioned at its ends to resist movement in a direction normal to a surface of the belt.

22. The method as set forth in claim 20, wherein the step of securing includes:

applying a threaded nut to a threaded end of the shaft; and compressing the plate between the nut and the bottom surface of the wear bar.

23. The method as set forth in claim 20, further including the steps of:

loosening the threaded nut whereby the plate is released from compression between the nut and the wear plate; and moving the wear bar laterally between the conveyor belt and plate so that the shaft becomes disassociated from the slot.

* * * * *